(12) United States Patent
Tian et al.

(10) Patent No.: US 12,347,126 B2
(45) Date of Patent: Jul. 1, 2025

(54) NON-CONTACT VISUAL MONITORING SYSTEM AND METHOD FOR A FLEXIBLE PROTECTIVE STRUCTURE AGAINST ROCKFALL DISASTER

(71) Applicant: Southwest Jiaotong University, Chengdu (CN)

(72) Inventors: Yongding Tian, Chengdu (CN); Jiahui Tong, Chengdu (CN); Yangfeng Lyu, Chengdu (CN); Xiaoyu Yang, Chengdu (CN); Jiaxin Chen, Chengdu (CN); Lintao Ma, Chengdu (CN); Hu Xu, Chengdu (CN); Zhixiang Yu, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/261,620

(22) PCT Filed: Jun. 5, 2023

(86) PCT No.: PCT/CN2023/098272
§ 371 (c)(1),
(2) Date: Jul. 14, 2023

(87) PCT Pub. No.: WO2023/236897
PCT Pub. Date: Dec. 14, 2023

(65) Prior Publication Data
US 2024/0273744 A1   Aug. 15, 2024

(30) Foreign Application Priority Data

Jun. 7, 2022  (CN) .......................... 202210638989.3

(51) Int. Cl.
G06T 7/579 (2017.01)
G01B 11/16 (2006.01)
G06T 7/207 (2017.01)

(52) U.S. Cl.
CPC .............. *G06T 7/579* (2017.01); *G01B 11/16* (2013.01); *G06T 7/207* (2017.01); *G06T 2207/20208* (2013.01); *G06T 2207/30184* (2013.01)

(58) Field of Classification Search
CPC .................... G06T 7/579; G06T 7/207; G06T 2207/20208; G06T 2207/30184; G01B 11/16
See application file for complete search history.

(56) References Cited

U.S. PATENT DOCUMENTS

2010/0310128 A1* 12/2010 Iliopoulos ............... G06T 7/246
                                                            382/209
2023/0298207 A1*  9/2023 Tatsuno .................... G06T 7/50
                                                            345/419

OTHER PUBLICATIONS

Dong et al., "Structural displacement monitoring using deep learning-based full field optical flow methods", 2020, Structure and Infrastructure Engineering, vol. 16, No. 1, 51-71 (Year: 2020).*

(Continued)

*Primary Examiner* — Chan S Park
*Assistant Examiner* — Daniel C Chang
(74) *Attorney, Agent, or Firm* — Getech Law LLC; Jun Ye (57) ABSTRACT

The invention relates to the technical field of intelligent construction and maintenance, and relates to a non-contact visual monitoring system and method for a flexible protective structure against rockfall disasters; it comprises a hardware system and a data analysis system, and the hardware system uses a multipoint distributed high-resolution high-speed camera to capture dynamic image sequences of a (Continued)

protective structure under the rockfall impact in a non-contact mode; the data analysis system comprises an impact deformation state full-field tracking module and a multipoint impact large deformation extraction module, and the impact deformation state full-field tracking module captures spatio-temporal changes of impact deformation of the protective system by adopting a full-field optical flow method, constructs a two-dimensional velocity amplitude distribution diagram and performs full-field spatio-temporal tracking of large deformation of the system.

3 Claims, 6 Drawing Sheets

(56) References Cited

OTHER PUBLICATIONS

CN 202210638989.3—Notification to Grant Patent Right for Invention (first office action), mailed Feb. 25, 2023, 2 pages. (with English translation).

* cited by examiner

| Sequence of image by a high-definition camera | Full-field deformation state: present invention | Full-field deformation state: numerical solution |
|---|---|---|
|  |  |  |

NON-CONTACT VISUAL MONITORING SYSTEM AND METHOD FOR A FLEXIBLE PROTECTIVE STRUCTURE AGAINST ROCKFALL DISASTER

CROSS REFERENCE OF RELATED APPLICATION

The present application is a 371 of international patent application PCT/CN2023/098272, filed Jun. 5, 2023, which claims priority to Chinese Patent Application No. 202210638989.3 filed on Jun. 7, 2022. The contents of the applications are incorporated herein by reference in their entireties.

TECHNICAL FIELD

The invention relates to the technical field of intelligent construction and maintenance, in particular to a non-contact visual monitoring system and method for a flexible protective structure against rockfall disasters.

BACKGROUND

At present, geological disasters such as rockfalls and debris flows are frequent and widely distributed. Disasters may easily lead to interruption of transportation hubs, posing a major threat to rescue and disaster relief. Therefore, effective protection and intelligent monitoring of rockfall and debris flow impact disasters are urgent problems to be solved. In recent years, emerging technologies such as intelligent sensing technology, the Internet of Things, and computer vision have developed rapidly, providing an opportunity for intelligent monitoring of impact disasters and protective systems.

Various sensing technologies have been widely used in the monitoring of high and steep slopes. According to different principles, they can be divided into contact sensing technology and non-contact sensing technology. The fiber grating sensor is a typical contact sensor technology. The fiber grating sensor can monitor the strain and displacement of each measuring point of the high and steep slope. However, the fiber grating sensor needs to be buried in the slope and placed in parallel with excavation in practical applications, so these sensors are easily damaged. To overcome this problem, various types of non-contact sensing technologies including total station, three-dimensional laser scanning technology, synthetic aperture radar, and visual imaging technology have been rapidly developed. In general, the existing sensing technologies mainly address the problem of slope stability, and the monitoring objects are mainly steady-state small-increment long-lasting deformation, and non-contact monitoring technology research on transient large-increment dynamic impact deformation is rarely reported. Therefore, it is necessary to study the large deformation monitoring technology of protection engineering under the rockfall impact.

The flexible protective net structure is a complex flexible structural system. Because of its strong protective ability and simple construction, it is widely used in protective engineering in railway, highway, energy, national defense, and other fields. At present, the monitoring of the working behavior of the flexible protective net system under rockfall and collapse disasters relies on contact sensing technology. Scholars at home and abroad have used contact-type equipment such as fiber grating dynamometers, accelerometers, and force sensors to monitor the dynamic characteristics of key structures such as the internal force of the mesh, the tension of the support rope, and the pull-down anchor rope of the passive flexible protective net system under the rockfall impact. However, due to the high price, difficult installation, and easy collision damage in actual use, practical use has limitations and shortcomings. Especially under the rockfall impact, the structure of the flexible protective net has obvious displacement characteristics such as instantaneous large deformation and large slippage. It will become very difficult to monitor the deformation and internal force of the interception unit directly subjected to the impact by contact.

SUMMARY

The present invention provides a non-contact visual monitoring system and method for the flexible protective structure against rockfall disasters, which can overcome the defects of the existing contact sensing technology, such as low efficiency, few monitoring points, and easy damage.

According to the non-contact visual monitoring system and method for the flexible protective structure against rockfall disasters, it comprises the hardware system and the data analysis system, and the hardware system uses the high-resolution high-speed camera to capture the dynamic image sequence of the protective structure under the rockfall impact in a non-contact mode; the data analysis system comprises the deformation state full-field tracking module and the multipoint impact large deformation extraction module for the flexible protective system, and the deformation state full-field tracking module tracks the full-field deformation of the protective structure under the rockfall impact by adopting the full-field optical flow method; the multipoint impact large deformation extraction module uses the image feature point detection and matching algorithm to simultaneously extract the multipoint dynamic impact large deformation of the protective net system under the rockfall impact and extract its maximum elongation.

The present invention also provides a non-contact visual monitoring method for the flexible protective structure against rockfall disasters, and it comprises the following steps:
1) Dynamic image capture of the protective system under rockfall impact disasters;
2) Full-field deformation state tracking of the flexible protective system;
3) Multipoint impact large deformation extraction of the flexible protective system.

Preferably, in 1), the specific method is as follows:
The high-speed camera arrangement plan is determined according to the size and installation position of the protective net. For the protective net structure with a small length, only a single set of visual measurement systems can be arranged. Otherwise, multiple sets of visual measurement systems should be arranged at intervals along the length distribution direction of the protective net.

Preferably, in 2), the specific method is as follows:
The grayscale of the image captured by the high-speed camera at t and t+dt is equal, namely:

$$I(x, y, t) = I(x + u(x, y), y + v(x, y), t + dt)$$

Where, $I(x+u(x,y), y+v(x,y), t+dt)$ is the image grayscale information of the pixel $(x, y)$ at $t+dt$; $I(x,y,t)$ is the grayscale information of the pixel $(x, y)$ at t; $u(x,y)$ and $v(x,y)$ are the horizontal and vertical displacement field components of the pixel (x, y) respectively; dt is the time interval;

The grayscale information of the pixel (x,y) at t+dt is approximated by the first-order Taylor expansion formula into:

$$I(x + u(x, y), y + v(x, y), t + dt) = I(x, y, t) + I_x u(x, y) + I_y v(x, y) + I_t dt$$

Where, $I_x$ and $I_y$ are the gray gradients of the image in the horizontal and vertical spatial domains, respectively, denoted as $I_x = \partial I(x,y,t)/\partial x$ and $I_y = \partial I(x,y,t)/\partial y$; $I_t$ is the gray gradient of the image in the temporal domain, denoted as $I_t = \partial I(x,y,t)/\partial t$;

Since the brightness between two adjacent frames of images remains unchanged:

$$I_x u(x, y) + I_y v(x, y) + I_t dt = 0$$

According to the assumption of spatial consistency, the displacement field vectors in both directions can be obtained by using 9 pixels in the 3×3 window, namely:

$$\begin{Bmatrix} u(x, y) \\ v(x, y) \end{Bmatrix} = \begin{bmatrix} \sum_{i=1}^{9} I_{xi}^2 & \sum_{i=1}^{9} I_{xi} I_{yi} \\ \sum_{i=1}^{9} I_{xi} I_{yi} & \sum_{i=1}^{9} I_{yi}^2 \end{bmatrix}^{-1} \begin{Bmatrix} -\sum_{i=1}^{9} I_{xi} I_{ti} \\ -\sum_{i=1}^{9} I_{yi} I_{ti} \end{Bmatrix}$$

Accordingly, the root mean square of the velocity amplitude of the flexible protective system at this point can be calculated, namely:

$$V_{mag}(x, y) = \sqrt{\left(\frac{u(x, y)}{dt}\right)^2 + \left(\frac{v(x, y)}{dt}\right)^2}$$

The root mean square of the velocity amplitude of all pixels in the shooting field of view is formed into a two-dimensional matrix, and the two-dimensional velocity amplitude distribution diagram can be obtained; by comparing the two-dimensional velocity amplitude distribution diagrams in different frames, the whole deformation process of the flexible structure under rockfall impact can be tracked;

Preferably, in 3), the specific method is as follows:

According to the deformation characteristics of the protective structure under the rockfall impact, the impact large deformation extraction area is determined, and the image centroids of each area are calculated separately, namely:

$$C = \left(\frac{m_{10}}{m_{00}}, \frac{m_{01}}{m_{00}}\right)$$

Where, $m_{00}$ is the 0-order moment of the image, expressed as $$m_{00} = \sum_{x,y} I(x, y);$$

$m_{10}$ and $m_{01}$ are the 1-order moments of the image, respectively, expressed as $$m_{10} = \sum_{x,y} xI(x, y) \text{ and } m_{01} = \sum_{x,y} yI(x, y);$$

Thus, the direction angle between the detection feature point and the image centroid is calculated as:

$$\theta = a\tan 2(m_{01}, m_{10})$$

The rotation matrix is formed by the direction angle, and the detected point pairs are rotated to obtain the feature points of the protective structure with rotation invariant characteristics; by comparing the detected feature points in different frames with the detected feature points in the reference frame, the dynamic deformation $d_i$ of the protective structure under the rockfall impact can be obtained, and the correlation coefficients of dynamic deformation curves of different feature points are defined to eliminate mismatching, namely:

$$R_{ij} = \frac{\sum_{n=1}^{N}(d_{ni} - \overline{d}_i)(d_{nj} - \overline{d}_j)}{\sqrt{\sum_{n=1}^{N}(d_{ni} - \overline{d}_i)^2}\sqrt{\sum_{n=1}^{N}(d_{nj} - \overline{d}_j)^2}}$$

Where, $d_{ni}$ and $d_{nj}$ are respectively the values of the dynamic deformation of the feature point i and the feature point j at the moment n; $\overline{d}_i$ and $\overline{d}_j$ are respectively the average values of the dynamic deformation of the feature point i and the feature point j; $R_{ij}$ is the correlation coefficient of the feature point i and the feature point j;

The conversion coefficient is used to convert the pixel displacement of the protective structure under the rockfall impact into physical displacement; according to the pinhole camera model and the principle of similar triangles, the following relationship can be obtained:

$$s = \frac{f}{p \times Z}$$

Where, f is the focal length of the camera; Z is the actual distance between the position of the camera and the measured object; p is the unit length (mm/pixel) of the camera sensor;

By multiplying this conversion factor by the dynamic pixel displacement at multiple measuring points of the protective structure under the rockfall impact, the real displacement of the protective structure can be obtained, and then its maximum elongation can be extracted and its performance status can be evaluated.

The invention first uses a high-speed camera system to monitor the dynamic image sequence of the flexible protective structure under the rockfall impact in a non-contact mode, and then uses computer vision technology to realize its motion information detection, and proposes a whole-process tracking method for the system deformation state based on the two-dimensional velocity amplitude distribution diagram; secondly, a protective system multipoint impact large deformation extraction method based on feature point detection and matching is invented, and then its maximum elongation under the rockfall impact is calculated. Different from the traditional contact sensing technology, the method of the present invention can obtain the full-field deformation state of the flexible protective structure under the rockfall impact and the multipoint impact large deformation in a non-contact, long-distance, and high-precision manner, which overcomes the problems of low efficiency, few monitoring points and easy damage by impact in the conventional contact sensing technology. The method of the invention can be directly applied to the prevention and control of geological disasters such as rockfall and collapse in China and has urgency and practical significance for ensuring people's livelihood and lifeline safety.

EMBODIMENTS

To further understand the content of the present invention, the present invention will be described in detail regarding the accompanying drawings and embodiments. t should be understood that the embodiments are only for explaining the present invention and not for limiting.

Embodiment 1

This embodiment provides a non-contact visual monitoring system and method for the flexible protection structure against rockfall disasters, it comprises the hardware system and the data analysis system, and the hardware system uses the high-resolution high-speed camera to capture the dynamic image sequence of the protection system under rockfall impact in a non-contact mode; the data analysis system comprises the deformation state full-field tracking module and the multipoint impact large deformation extraction module for the flexible protection structure, and the deformation state full-field tracking module captures the full-field deformation of the protective net structure under the rockfall impact by adopting a full-field optical flow method; the multipoint impact large deformation extraction module uses the image feature point detection and matching algorithm to simultaneously extract the multipoint dynamic impact large deformation of the protective structure under the rockfall impact and extract its maximum elongation.

Figure 1:
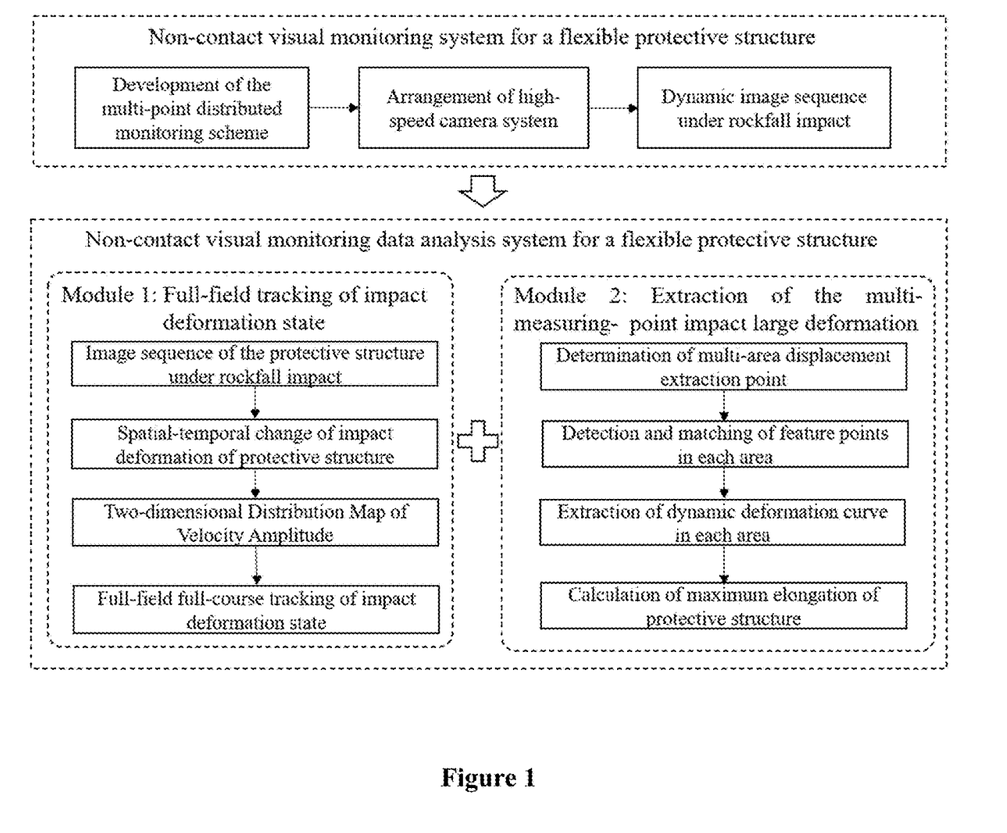
FIG. 1 is a flowchart of a non-contact visual monitoring method for the flexible protective structure against rockfall disasters in Embodiment 1.

As shown in FIG. 1, this embodiment provides the non-contact visual monitoring method for the flexible protective structure against rockfall disasters, and it comprises the following steps:

1. Full-field tracking of the impact deformation state of the flexible protective structure: process the image sequence of the protective structure under the rockfall impact captured by the high-speed camera to obtain the spatio-temporal changes of the impact deformation of the protective structure, and use the full-field optical flow method to obtain the full-field velocity vector distribution of the protective net structure, and build the two-dimensional velocity amplitude distribution diagram and track all the frame images captured by the high-speed camera, to capture the full-field and whole-process tracking of the impact deformation state of the protective structure;

Specifically including the following steps:

1) Image data collection: the high-speed camera arrangement plan is determined according to the size and installation position of the protective net system. For the protective net structure with a small length, only a single set of visual measurement systems can be arranged. Otherwise, multiple sets of visual measurement systems should be arranged at intervals along the length distribution direction of the protective net;

2) Full-field deformation state tracking of the protective structure:

The grayscale of the image captured by the high-speed camera at t and t+dt is equal, namely:

$$I(x, y, t) = I(x + u(x, y), y + v(x, y), t + dt)$$

Where, $I(x+u(x,y),y+v(x,y),t+dt)$ is the image grayscale information of the pixel (x,y) at t+dt; $I(x,y,t)$ is the grayscale information of the pixel (x,y) at t; $u(x,y)$ and $v(x,y)$ are the horizontal and vertical displacement field components of the pixel (x,y) respectively; dt is the time interval;

The grayscale information of the pixel (x,y) at t+dt is approximated by the first-order Taylor expansion formula into:

$$I(x + u(x, y), y + v(x, y), t + dt) = I(x, y, t) + I_x u(x, y) + I_y v(x, y) + I_t dt$$

Where, $I_x$ and $I_y$ are the gray gradients of the image in the horizontal and vertical spatial domains, respectively, denoted as $I_x = \partial I(x,y,t)/\partial x$ and $I_y = \partial I(x,y,t)/\partial y$; $I_t$ is the gray gradient of the image in the temporal domain, denoted as $I_t = \partial I(x,y,t)/\partial t$;

Since the brightness between two adjacent frames of images remains unchanged:

$$I_x u(x, y) + I_y v(x, y) + I_t dt = 0$$

According to the assumption of spatial consistency, the displacement field vectors in both directions can be obtained by using 9 pixels in the 3×3 window, namely:

$$\begin{Bmatrix} u(x, y) \\ v(x, y) \end{Bmatrix} = \begin{bmatrix} \sum_{i=1}^{9} I_{xi}^2 & \sum_{i=1}^{9} I_{xi} I_{yi} \\ \sum_{i=1}^{9} I_{xi} I_{yi} & \sum_{i=1}^{9} I_{yi}^2 \end{bmatrix}^{-1} \begin{Bmatrix} -\sum_{i=1}^{9} I_{xi} I_{ti} \\ -\sum_{i=1}^{9} I_{yi} I_{ti} \end{Bmatrix}$$

Accordingly, the root mean square of the velocity amplitude of the flexible protection system at this point can be calculated, namely:

$$V_{mag}(x, y) = \sqrt{\left(\frac{u(x, y)}{dt}\right)^2 + \left(\frac{v(x, y)}{dt}\right)^2}$$

The root mean square of the velocity amplitude of all pixels in the shooting field of view is formed into a two-dimensional matrix, and the two-dimensional velocity amplitude distribution diagram can be obtained; by comparing the two-dimensional velocity amplitude distribution diagrams in different frames, the whole deformation process of the flexible protection system under the rockfall impact can be tracked;

2. Multipoint impact large deformation extraction of flexible protective structure: According to the size of the protective net structure, determine the displacement extraction points at multiple regions of interests of the protective structure under the rockfall impact, and use the feature point detection algorithm to detect and match the feature points in each area. Due to the characteristics of large deformation of the protective structure, it is necessary to further screen the extracted deformation of each area according to the relevant criteria, to realize the accurate extraction of dynamic deformation curves in each area, calculate the maximum elongation of the protective structure under the rockfall impact and provide key data support for the performance verification of the protective structure under the rockfall impact;

The specific method is as follows:

According to the deformation characteristics of the protection structure under the rockfall impact, the impact large deformation extraction area is determined, and the image centroids of each area are calculated separately, namely:

$$C = \left(\frac{m_{10}}{m_{00}}, \frac{m_{01}}{m_{00}}\right)$$

Where, $m_{00}$ is the 0-order moment of the image, expressed as $$m_{00} = \sum_{x,y} I(x, y);$$

$m_{10}$ and $m_{01}$ are the 1-order moments of the image, respectively, expressed as $$m_{10} = \sum_{x,y} xI(x, y)$$

and $$m_{01} = \sum_{x,y} yI(x, y);$$

Thus, the direction angle between the detection feature point and the image centroid is calculated as:

$$\theta = a\tan 2\,(m_{01}, m_{10})$$

The rotation matrix is formed by the direction angle, and the detected point pairs are rotated to obtain the feature points of the protection structure with rotation invariant characteristics; by comparing the detected feature points in different frames with the detected feature points in the reference frame, the dynamic deformation $d_i$ of the protection structure under the rockfall impact can be obtained, and the correlation coefficients of dynamic deformation curves of different feature points are defined to eliminate mismatching, namely:

$$R_{ij} = \frac{\sum_{n=1}^{N}(d_{ni} - \bar{d}_i)(d_{nj} - \bar{d}_j)}{\sqrt{\sum_{n=1}^{N}(d_{ni} - \bar{d}_i)^2}\sqrt{\sum_{n=1}^{N}(d_{nj} - \bar{d}_j)^2}}$$

Where, $d_{ni}$ and $d_{nj}$ are respectively the values of the dynamic deformation of the feature point i and the feature point j at the moment n; $\bar{d}_i$ and $\bar{d}_j$ are respectively the average values of the dynamic deformation of the feature point i and the feature point j; $R_{ij}$ is the correlation coefficient of the feature point i and the feature point j;

The conversion coefficient is used to convert the pixel displacement of the protection structure under rockfall impact into physical displacement; according to the pinhole camera model and the principle of similar triangles, the following relationship can be obtained:

$$s = \frac{f}{p \times Z}$$

Where, f is the focal length of the camera; Z is the actual distance between the position of the camera and the measured object; p is the unit length (mm/pixel) of the camera sensor;

By multiplying this conversion factor by the dynamic pixel displacement at multiple measuring points of the protection structure under rockfall impact, the real displacement of the protection structure can be obtained, and then its maximum elongation can be extracted and its performance status can be evaluated.

Embodiment 2

Figure 2:
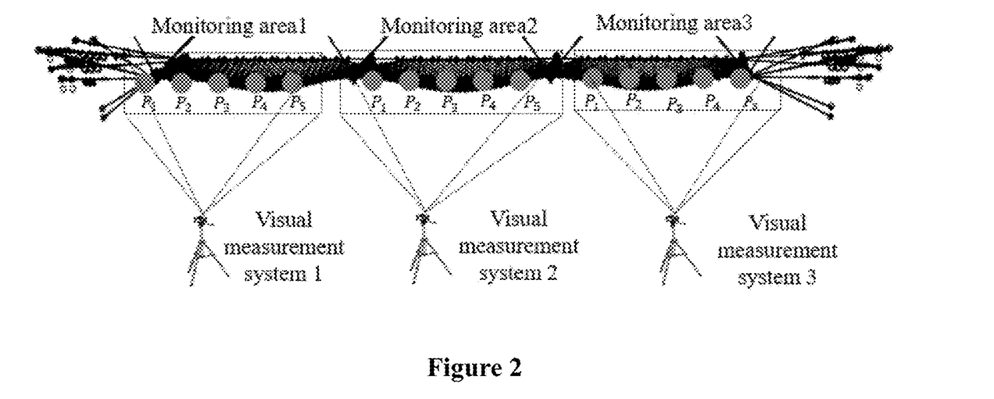
FIG. 2 is a visual measurement flow chart of a three-span flexible protective structure in Embodiment 2.
Figure 3:
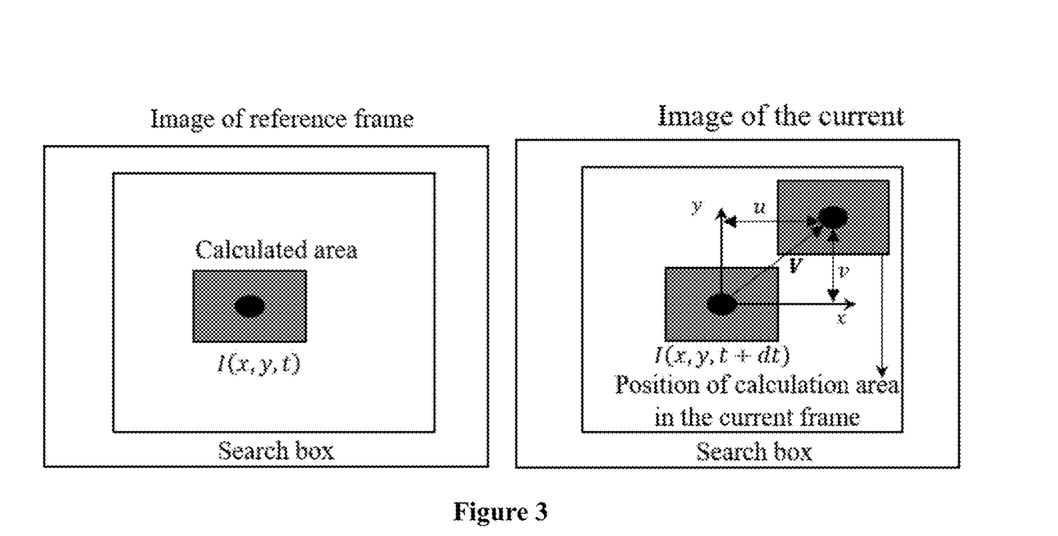
FIG. 3 is a schematic diagram of the method for detecting full-field optical flow motion in Embodiment 2.
Figure 4:
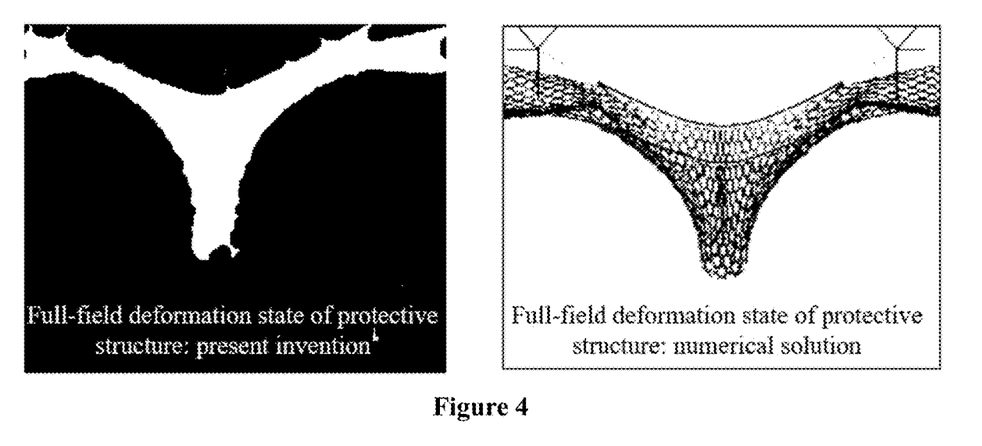
FIG. 4 is the full-field deformation state identification of the protective net system in Embodiment 2.
Figure 5:
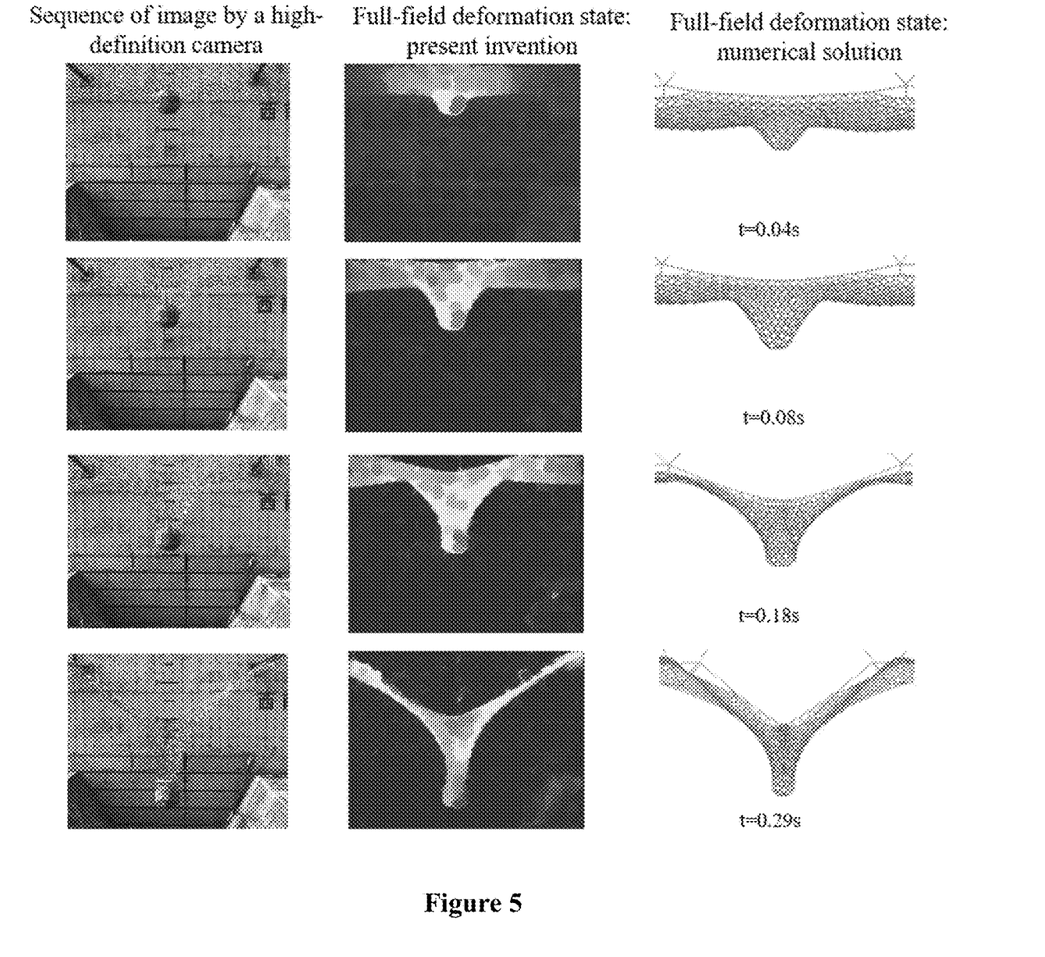
FIG. 5 is the full-field deformation state tracking of the protective net at different time points in Embodiment 2.

According to FIGS. 2~7, a three-span flexible protective structure case illustrates the specific implementation process of the non-contact visual monitoring method for flexible protective structures against rockfall disasters in this embodiment. The specific steps are as follows:

1) Image data collection of protective structure: the aperture of the test model ring net is 0.3 m, with a total of three links, the width of each link is 10 meters, the cantilever length of the supporting steel column is 4 meters, the size of the single network piece is 4 m×10 m, and the total area is 120 m². The vibration image sequence (as shown in FIG. 2) of the middle span of the flexible protective structure under the rockfall is captured by a high-speed camera. To ensure the vibration information covers the entire field of the large protective structure, the method of multipoint distributed simultaneous data acquisition can be adopted.

2) Full-field deformation state tracking of the protective structure: the spatio-temporal motion detection algorithm (FIG. 3) of the method of the present invention is used to analyze the captured image and obtain its velocity vector distribution under rockfall impact, and then the velocity information of all pixels is used to obtain the two-dimensional velocity amplitude distribution diagram (FIG. 4) of the protective structure, and its full-field deformation state is consistent with the numerical solution. B further extracting the whole process of deformation of the protective structure under the rockfall impact (FIG. 5), it can be seen that when the falling rocks just contact the protective net system (t=0.04 s), the protective net begins to deform, and then the deformation of the protective net increases and gradually becomes narrow (t=0.18 s, 0.35 s); To verify the correctness of the non-contact monitoring of the deformation state of the protective structure, the deformation state of the protective structure under the impact of the falling hammer is simulated by using LS-DYNA (right side of FIG. 5). It can be seen that the deformation state of the protective structure simulated by the finite element software is consistent with the result of the non-contact visual monitoring, and the correctness and effectiveness of the method of the invention are verified.

Figure 6:
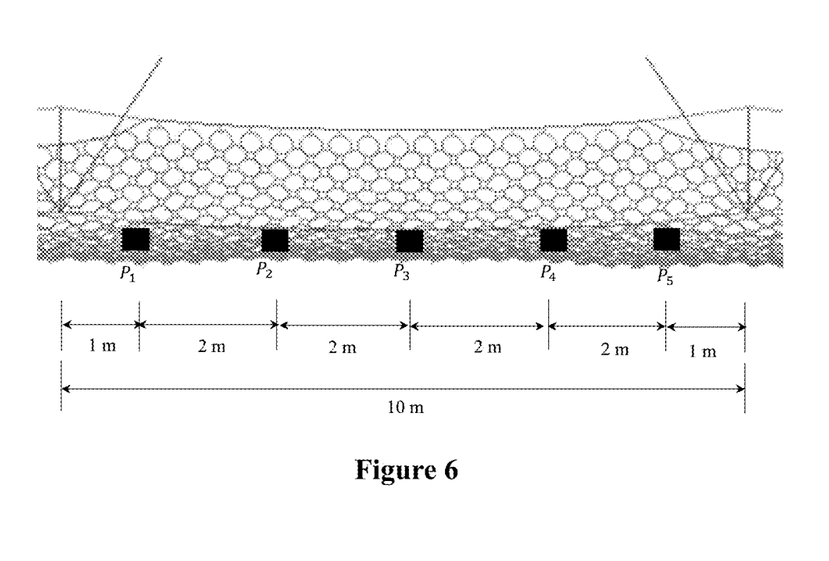
FIG. 6 is a schematic diagram of the multipoint impact deformation extraction of the protective structure in Embodiment 2.
Figure 7:
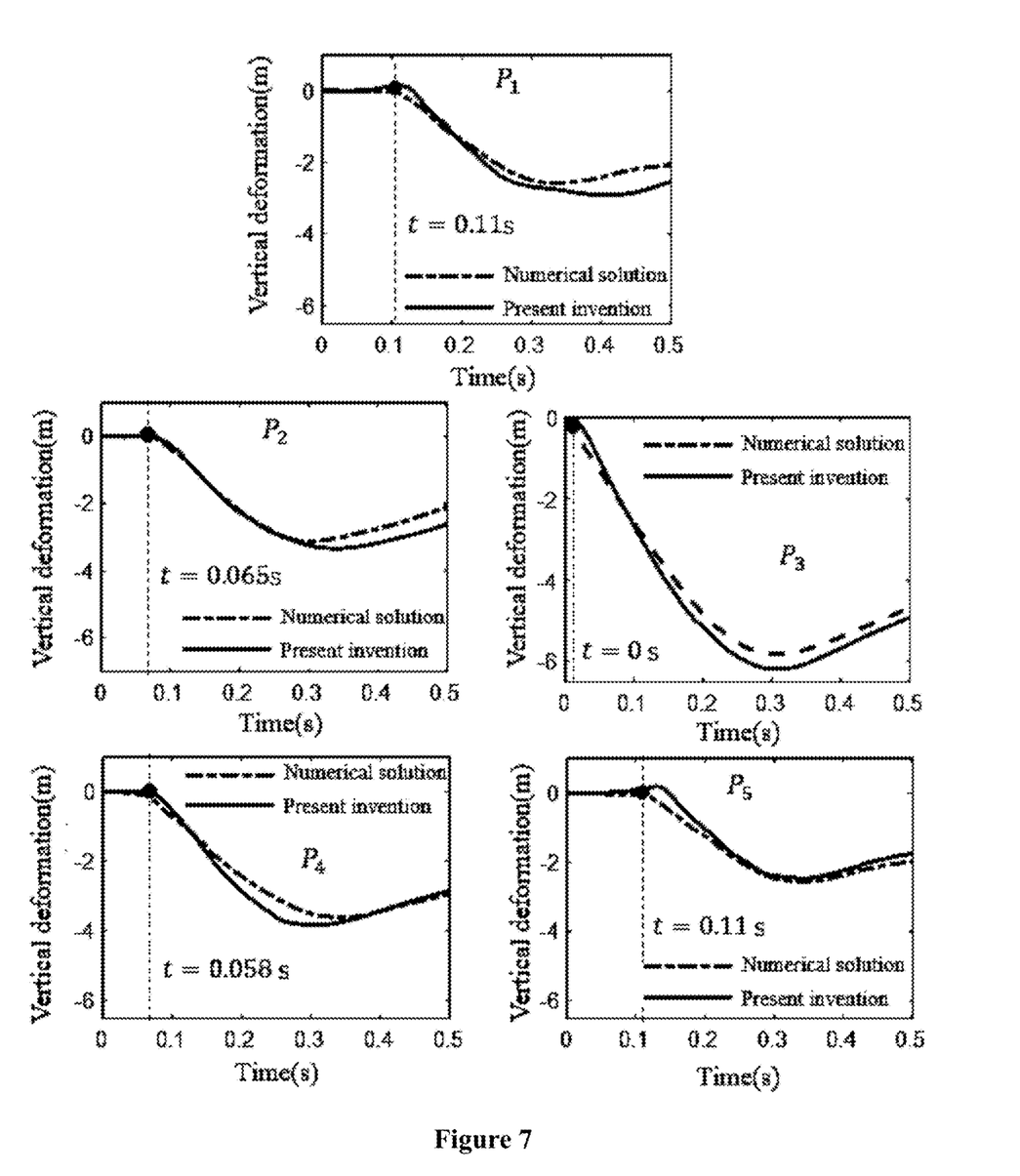
FIG. 7 is a contrast diagram of the multipoint dynamic deformation curve and theoretical value in Embodiment 2.

3) Multipoint impact large deformation extraction of protective structure: the method of the present invention can extract the multipoint large dynamic impact deformation of protective structure under the rockfall impact from the video shot by the high-speed camera. In this embodiment, the multipoint deformation extraction diagram is shown in FIG. 6. The vertical deformation curve of five measuring points of the flexible protective structure extracted by the feature point detection algorithm is compared with the theoretical value, as shown in FIG. 7. It can be seen that the dynamic deformation curve of each measuring point of the protective structure extracted by the feature point detection algorithm of the present invention is consistent with the theoretical value, but the maximum deformation value generated by each measuring point is different, and the maximum deformation value from the measuring point P1 to the measuring point P5 are −2.755 m, −3.244 m, −6.201 m, −3.723 m and −2.473 m respectively. It can be seen that the maximum deformation position of the protective structure under the rockfall impact is at the measuring point P3, and its deformation value is the largest. The measured value is −6.201 m, and the relative error between it and the theoretical value is 6.41%. The correctness and robustness of the method for extracting deformation and maximum elongation at multiple measuring points of the protective structure are verified.

The present invention and its embodiments are schematically described above, which is not restrictive, what is shown in the drawings is only one of the embodiments of the present invention, and the actual structure is not limited thereto. Therefore, if as inspired by the present invention, without departing from the inventive concept of the present invention, the structure and embodiments similar to this technical solution designed without creativity shall by those of ordinary skill in the art shall all belong to the protection scope of the present invention.

What is claimed:

1. A non-contact visual monitoring system for a flexible protective structure against rockfall disasters, characterized in that the non-contact visual monitoring system comprising:

a hardware system and a data analysis system, the hardware system uses a multipoint distributed high-resolution high-speed camera to collect a dynamic image sequence of a flexible protective structure under a rockfall impact in a non-contact mode;

wherein the data analysis system comprises an impact deformation state full-field tracking module and a multipoint impact large deformation extraction module for the flexible protective structure, wherein the impact deformation state full-field tracking module for the flexible protective structure captures a full-field deformation state of the flexible protective structure under the rockfall impact by adopting a full-field optical flow method, wherein the impact deformation state full-field tracking module processes the dynamic image sequence of the flexible protective structure under the rockfall impact captured by the multipoint distributed high-resolution high-speed camera to obtain spatio-temporal changes of impact deformation of the flexible protective structure, uses the full-field optical flow method to obtain a full-field velocity vector distribution of the flexible protective structure, and builds a two-dimensional velocity amplitude distribution diagram and tracks all frame images captured by the multipoint distributed high-resolution high-speed camera, to capture a full-field and whole-process tracking of the impact deformation state of the flexible protective structure;

wherein the multipoint impact large deformation extraction module uses an image feature point detection and matching algorithm to extract a multipoint dynamic impact large deformation of the flexible protective structure under the rockfall impact and a maximum elongation based on the multipoint dynamic impact large deformation and evaluating a performance status of the flexible protective structure based on the maximum elongation.

2. A non-contact visual monitoring method for a flexible protective structure against rockfall disasters, characterized in that the non-contact visual monitoring system comprises the following steps:

1) capturing dynamic image of flexible protective structures under rockfall impact disasters;

2) tracking full-field deformation state of the flexible protective structure;

In 2), a specific method for full-field deformation state tracking of the flexible protective structure is as follows:

A grayscale of an image captured by a high-speed camera at t and t+dt is equal, namely:

$$I(x, y, t) = I(x + u(x, y), y + v(x, y), t + dt)$$

Where, I(x+u(x,y),y+v(x,y),t+dt) is the image grayscale information of the pixel (x,y) at t+dt I(x,y,t) is the grayscale information of the pixel (x,y) at t u(x,y) and v(x,y) are the horizontal and vertical displacement field components of the pixel (x,y) respectively: dt is the time interval;

The grayscale information of the pixel (x,y) at t+dt is approximated by the first-order Taylor expansion formula into:

$$I(x+u(x,y), y+v(x,y), t+dt) = I(x,y,t) + I_x u(x,y) + I_y v(x,y) + I_t dt$$

Where, $I_x$ and $I_y$ are the gray gradients of the image in the horizontal and vertical spatial domains, respectively, denoted as $I_x = \partial I(x,y,t)/\partial x$ and $I_y = \partial I(x,y,t)/\partial y$; $I_t$ is the gray gradient of the image in the temporal domain, denoted as $I_t = \partial I(x,y,t)/\partial t$;

obtaining displacement field vectors in both directions by using 9 pixels in the 3×3 window, namely:

$$\begin{Bmatrix} u(x,y) \\ v(x,y) \end{Bmatrix} = \begin{bmatrix} \sum_{i=1}^{9} I_{xi}^2 & \sum_{i=1}^{9} I_{xi}I_{yi} \\ \sum_{i=1}^{9} I_{xi}I_{yi} & \sum_{i=1}^{9} I_{yi}^2 \end{bmatrix}^{-1} \begin{Bmatrix} -\sum_{i=1}^{9} I_{xi}I_{ti} \\ -\sum_{i=1}^{9} I_{yi}I_{ti} \end{Bmatrix}$$

calculating a root mean square of the velocity amplitude of the flexible protective structure at the point, namely:

$$V_{mag}(x,y) = \sqrt{\left(\frac{u(x,y)}{dt}\right)^2 + \left(\frac{v(x,y)}{dt}\right)^2}$$

The root mean square of the velocity amplitude of all pixels in a shooting field of view is formed into a two-dimensional matrix, and obtaining a two-dimensional velocity amplitude distribution diagram; by comparing the two-dimensional velocity amplitude distribution diagrams in different frames, tracking a whole deformation process of the flexible protective structure under the rockfall impact;

3) extracting multipoint impact large deformation extraction of the flexible protective structure;

In 3), an extraction method of a multipoint impact large deformation of the flexible protective structure is as follows:

According to deformation characteristics of the flexible protective structure under the rockfall impact, an impact large deformation extraction area is determined, and calculating image centroids of each area separately, namely:

$$C = \left(\frac{m_{10}}{m_{00}}, \frac{m_{01}}{m_{00}}\right)$$

Where, $m_{00}$ is the 0-order moment of the image, expressed as $$m_{00} = \sum_{x,y} I(x,y);$$

$m_{10}$ and $m_{01}$ are the 1-order moments of the image, respectively, expressed as $$m_{10} = \sum_{x,y} xI(x,y)$$

and $$m_{01} = \sum_{x,y} yI(x,y);$$

Thus, a direction angle between a detection feature point and the image centroid is calculated as:

$$\theta = a\tan 2(m_{01}, m_{10})$$

A rotation matrix is formed by the direction angle, and detected point pairs are rotated to obtain feature points of the flexible protective structure with rotation invariant characteristics; by comparing the detected feature points in different frames with the detected feature points in a reference frame, obtaining a dynamic deformation $d_i$ of the flexible protective structure under the rockfall impact, and correlation coefficients of dynamic deformation curves of different feature points are defined to eliminate mismatching, namely:

$$R_{ij} = \frac{\sum_{n=1}^{N}(d_{ni} - \bar{d}_i)(d_{nj} - \bar{d}_j)}{\sqrt{\sum_{n=1}^{N}(d_{ni} - \bar{d}_i)^2}\sqrt{\sum_{n=1}^{N}(d_{nj} - \bar{d}_j)^2}}$$

Where, $d_{ni}$ and $d_{nj}$ are respectively the values of the dynamic deformation of the feature point i and the feature point j at the moment n; $\bar{d}_i$ and $\bar{d}_j$ are respectively the average values of the dynamic deformation of the feature point i and the feature point j; $R_{ij}$ is the correlation coefficient of the feature point i and the feature point j;

A conversion coefficient is used to convert pixel displacement of the flexible protective structure under the rockfall impact into physical displacement; according to the pinhole camera model and the principle of similar triangles, obtaining the following relationship:

$$s = \frac{f}{p \times Z}$$

Where, f is the focal length of the high-speed camera; Z is the actual distance between a position of the high-speed camera and a measured object; p is the unit length of the high-speed camera;

By multiplying the conversion coefficient by the pixel displacement at multiple measuring points of the flexible protective structure under the rockfall impact, obtaining a real displacement of the flexible protective structure, and then extracting a maximum elongation based on the real displacement and evaluating a performance status-of the flexible protective structure based on the maximum elongation.

3. A non-contact visual monitoring method for a flexible protective structure against rockfall disasters according to claim 2, characterized in that: in 1), the dynamic image capture method is as follows: according to a size of the flexible protective structure, determining multipoint distributed image data collection and arrangement plan, and capturing a dynamic image sequence of the flexible protective structure under the rockfall impact.

* * * * *